(12) United States Patent
Hsu et al.

(10) Patent No.: US 8,184,237 B2
(45) Date of Patent: May 22, 2012

(54) DISPLAY DEVICE

(75) Inventors: Wei-Cheng Hsu, Taoyuan County (TW); Chieh-Yuan Cheng, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 383 days.

(21) Appl. No.: 12/508,602

(22) Filed: Jul. 24, 2009

(65) Prior Publication Data

US 2010/0020260 A1    Jan. 28, 2010

(30) Foreign Application Priority Data

Jul. 25, 2008    (TW) .............................. 97128317 A (51) Int. Cl.
*G02F 1/1333*    (2006.01)
*G02F 1/1335*    (2006.01)

(52) U.S. Cl. .......................................... 349/65; 349/58

(58) Field of Classification Search .............. 349/58–71, 349/149–152
See application file for complete search history.

(56) References Cited

U.S. PATENT DOCUMENTS

| 7,667,789 B2 * | 2/2010 | Choi et al. ...................... 349/65 |
| 2007/0047214 A1 | 3/2007 | Nesterenko et al. |
| 2007/0120833 A1 * | 5/2007 | Yamaguchi et al. .......... 345/173 |
| 2007/0258267 A1 | 11/2007 | Huang et al. |

FOREIGN PATENT DOCUMENTS

| CN | 1710921 A | 12/2005 |
| CN | 101202817 A | 6/2008 |
| TW | 200528895 A | 9/2005 |

* cited by examiner

*Primary Examiner* — Dung T. Nguyen (57) ABSTRACT

The display device of the present invention includes a housing, a display module, and a signal receiver. The housing has a front opening; the display module includes a backlight module. A display area is formed on the display module corresponding to the front opening. The signal receiver is disposed in the display module and is located outside the display area, to receive signals.

11 Claims, 7 Drawing Sheets

DISPLAY DEVICE

This application claims priority based on a Taiwanese patent application No. 097128317 filed on Jul. 25, 2008, the disclosure of which is incorporated herein by reference in its entirety.

BACKGROUND OF THE INVENTION

1. Field of the Invention

The invention relates to a display device. More particularly, the invention relates to a display device having a signal receiver.

2. Description of the Prior Art

In recent years, a display device is widely applied to various kinds of products, e.g. consumer electronic products such as liquid crystal display devices, computer monitors, or digital photo frames. As the development of the display technology continuously advances and the display devices become indispensable, the exterior appearance design of the display devices is one of many concerns of consumers'. Presently, the display devices in the market such as televisions or digital photo frames are usually provided with a signal receiver on the edge of the display devices to receive remote control signals. Generally, in order to receive signals, the signal receiver is exposed through a hole disposed on the edge of the display device or disposed in the hole and covered with a transparent material or a semi-transparent material. However, in terms of appearance design, the hole disposed on the edge of the screen may degrade the integral appearance of the display device.

Figure 1A:
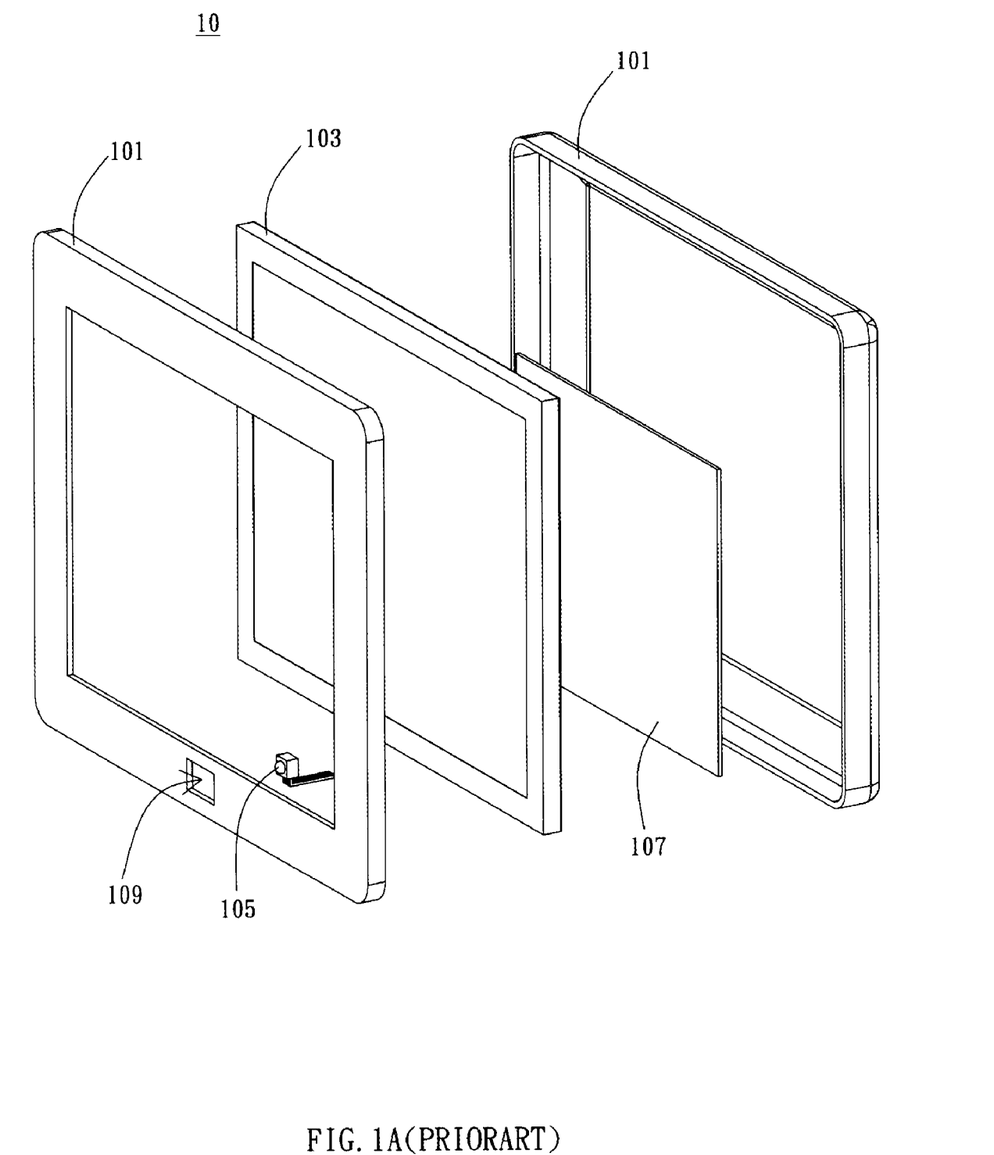
FIG. 1A illustrates an exploded view of a conventional display device.
Figure 1B:
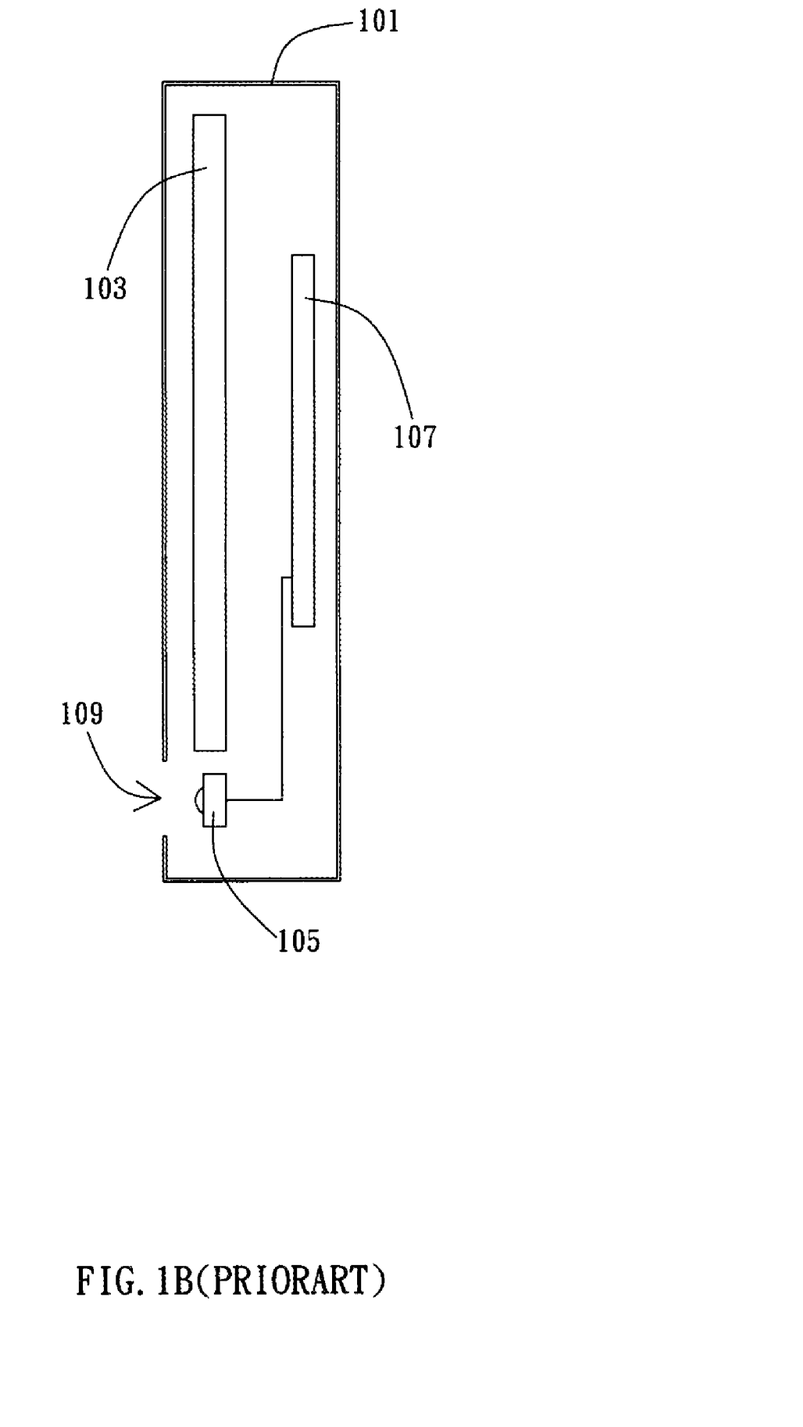
FIG. 1B illustrates a side view of the conventional display device.

For example, please refer to FIGS. 1A and 1B which are respectively an exploded view and a side view of a conventional display device 10. A hole 109 is disposed on a frame of the display device 10 to expose a signal receiver 105. The display device 10 shown in FIGS. 1A and 1B includes a housing 101, a display module 103, the signal receiver 105, and a circuit board 107. As shown in FIG. 1B, the display module 103 is disposed in the housing 101, and the signal receiver 105 likewise disposed in the housing 101 is electrically connected to the circuit board 107. Moreover, the hole 109 is disposed on the frame of the housing 101 and corresponds to the signal receiver 105. As such, the signal receiver 105 is exposed to receive signals such as infrared ray remote control signals. However, if the display device shown in FIG. 1A is designed as a digital photo frame having a traditional wooden frame design, the hole formed on the frame and the exposed signal receiver may affect the wooden frame's quality and authenticity.

SUMMARY OF THE INVENTION

It is an objective of the present invention to provide a display device without forming a hole on the housing for exposing a signal receiver to receive external signals.

It is another objective of the present invention to provide a display device capable of saving circuit space and simplifying structural design.

According to one embodiment of the present invention, a display device includes a housing, a display module, and a signal receiver. In an exemplary embodiment, the signal receiver is disposed on a light source module in the backlight module and corresponds to a cover portion formed by the frame. Light signal is transmitted to the signal receiver through a light guide plate. In another exemplary embodiment of the present invention, the signal receiver is disposed on an edge of the display panel and corresponds to the cover portion. In still another embodiment of the present invention, the signal receiver is disposed directly on the cover portion of the frame.

DETAILED DESCRIPTION OF THE PREFERRED EMBODIMENT

The present invention provides a display device which can receive signals from outside. In a preferred embodiment of the present invention, the display device includes any display device capable of receiving remote control signals, such as televisions, monitors of personal computers, display screens of laptop computers, or digital photo frames, etc. In an embodiment of the present invention, the display device can receive remote control signals from a user (operating a wireless remote control), so as to change the setting of the display device or the display information.

Figure 2:
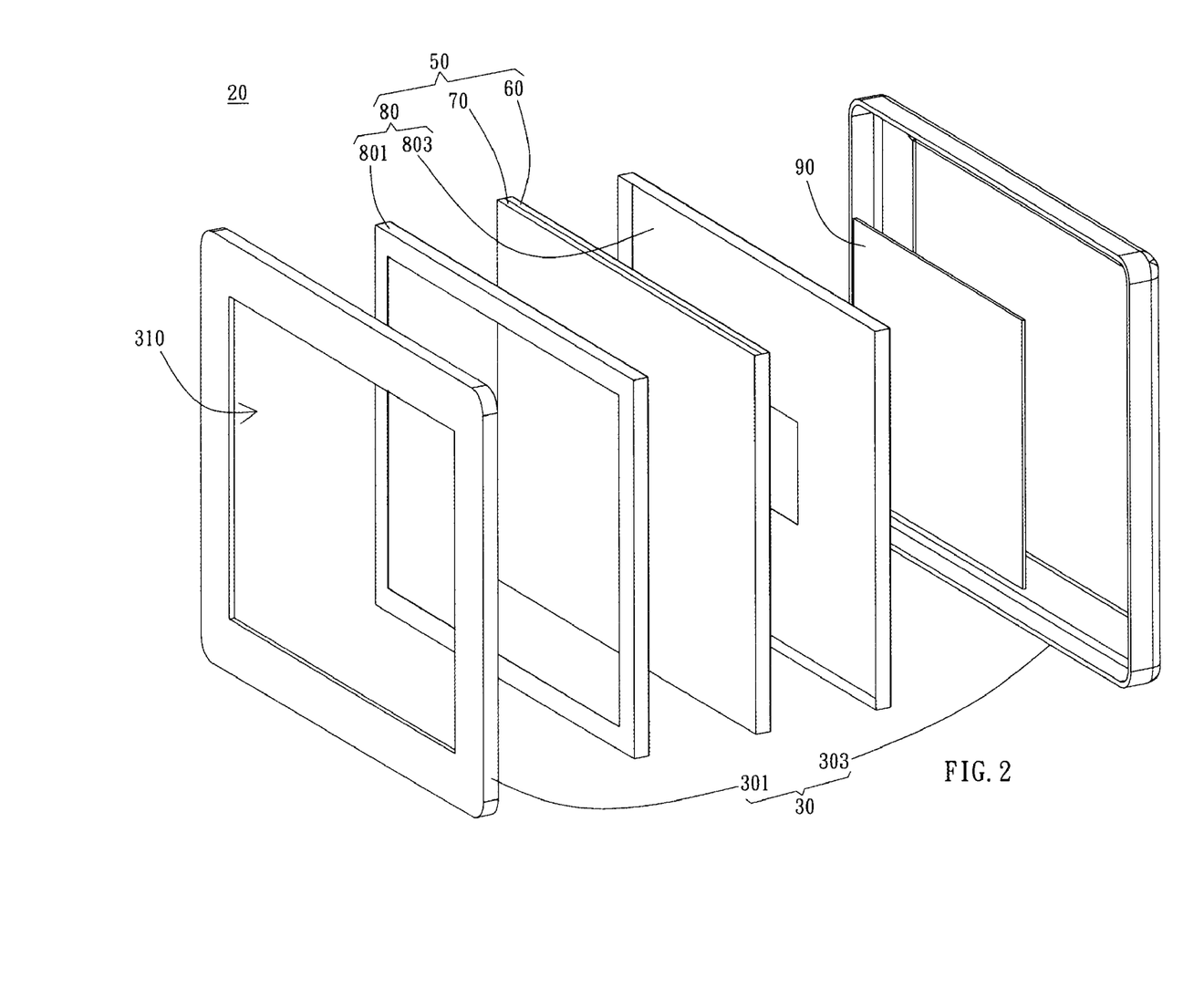
FIG. 2 illustrates an exploded view of one embodiment of a display device of the present invention.

FIG. 2 is an exploded view illustrating a display device 20 according to one embodiment of the present invention. The display device 20 includes a housing 30, a display module 50, and a circuit board 90. The display module 50 is, for example, a liquid crystal display module. The display module 50 and the circuit board 90 are disposed inside the housing 30. The housing 30 includes a front housing 301 and a rear housing 303. A front opening 310 is formed on the front housing 301 of the housing 30. The display module 50 faces the front opening 310. A portion of the display module 50 exposed through the front opening 310 is defined as a display area, i.e., an area for displaying images. A portion of the display module 50 covered by the front frame 301, i.e. the portion not exposed through the front opening 310, is defined as a non-display area. The circuit board 90 is disposed between the display module 50 and the rear housing 303. There are electronic components disposed on the circuit board 90 for operation of the display device 20. The display module 50 further includes a backlight module 60, a display panel 70, and a frame 80. The frame 80 includes a front frame 801 and a rear frame 803 to fix the backlight module 60 and the display panel 70 therebetween. The structure of the backlight module 60 and the display panel 70 are described in detail below.

Figure 3:
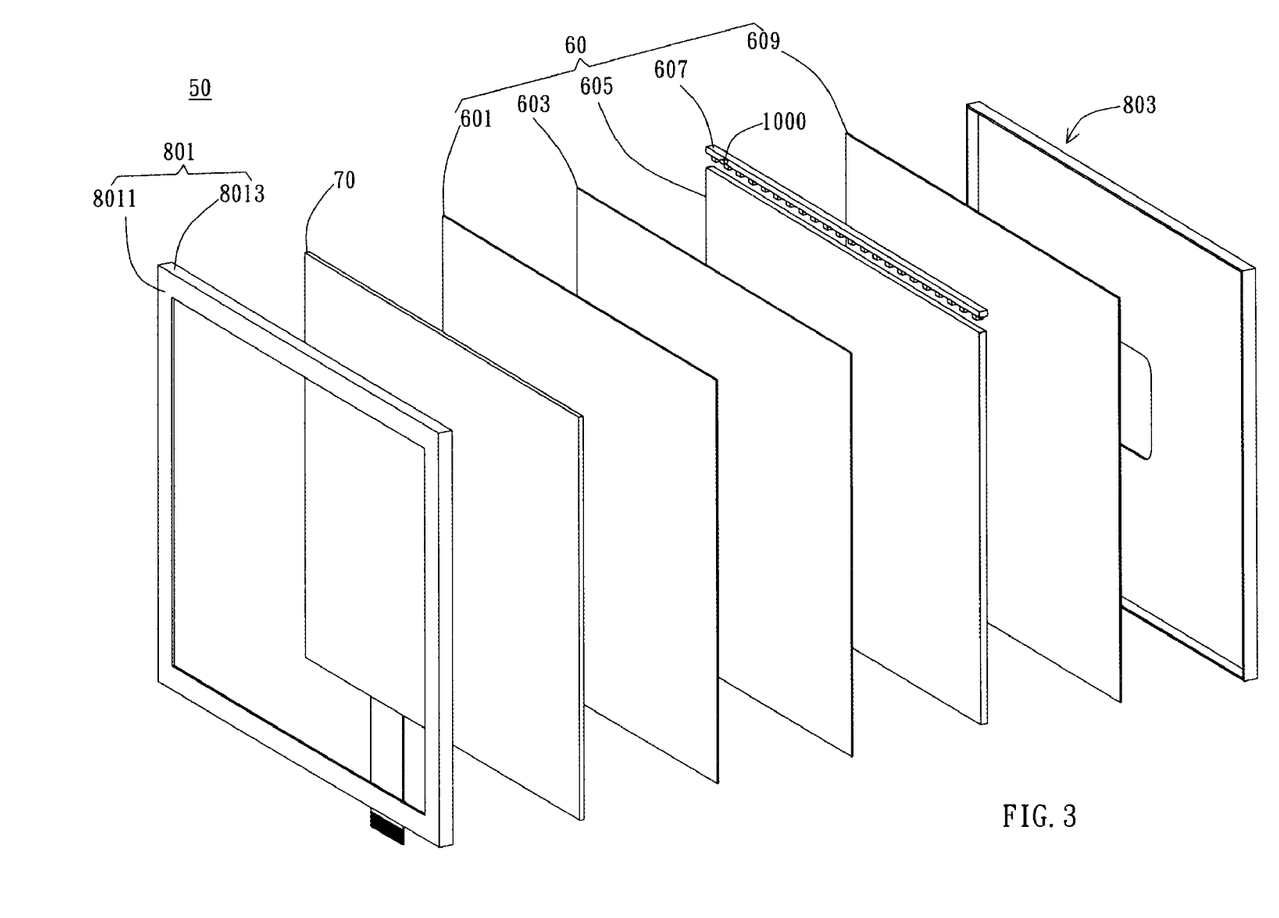
FIG. 3 illustrates an exploded view of an embodiment of a display module of the display device according to the present invention.

FIG. 3 is an exploded view of the display module 50 of the display device according to one embodiment of the present invention. The backlight module 60 of the display module 50 includes a diffusion plate 601, a prism plate 603, a light guide plate 605, a light source module 607, and a reflection plate 609. The diffusion plate 601 and the prism plate 603 are optical films made of optical resin. The diffusion plate 601 and the prism plate 603 are transparent to light and configured to improve the light output efficiency and to adjust the light distribution to achieve uniformity of light. According to the present embodiment, the light source module 607 is an edge type light source module which is disposed on one side of the light guide plate 605. Light emitted from the light source module 607 is uniformly distributed across the entire display panel by means of the light guide plate 605. For example, the light source can be light emitting diodes (LEDs) or other light emitting components and is not limited thereto. The reflection plate 609 disposed behind the light guide plate 605 is configured to reflect the light from the light source module 607 and the light guide plate 605 back to the light guide plate 605, thereby achieving high light emitting efficiency.

According to the above-mentioned embodiment, the display device further includes a signal receiver disposed inside the backlight module corresponding to the non-display area. As shown in FIG. 3, the signal receiver 1000 of the present embodiment is disposed on the light source module 607 and connected to the light source module 607. The signal receiver 1000 may be directly electrically connected to the light source module 607 or indirectly electrically connected to the backlight module 60 or the display module 50 through additional connections for necessary power supply. According to the present embodiment, the signal receiver 1000 is, for example, a light signal receiver for receiving a light signal or a directional light signal receiver for receiving signals such as infrared light signals. In the present embodiment, the signal receiver 1000 is disposed on one side of the light source module 607, and the directional infrared signal is incident to the light guide plate 605 and then transmitted to the signal receiver 1000 via the light guide plate 605.

Figure 4:
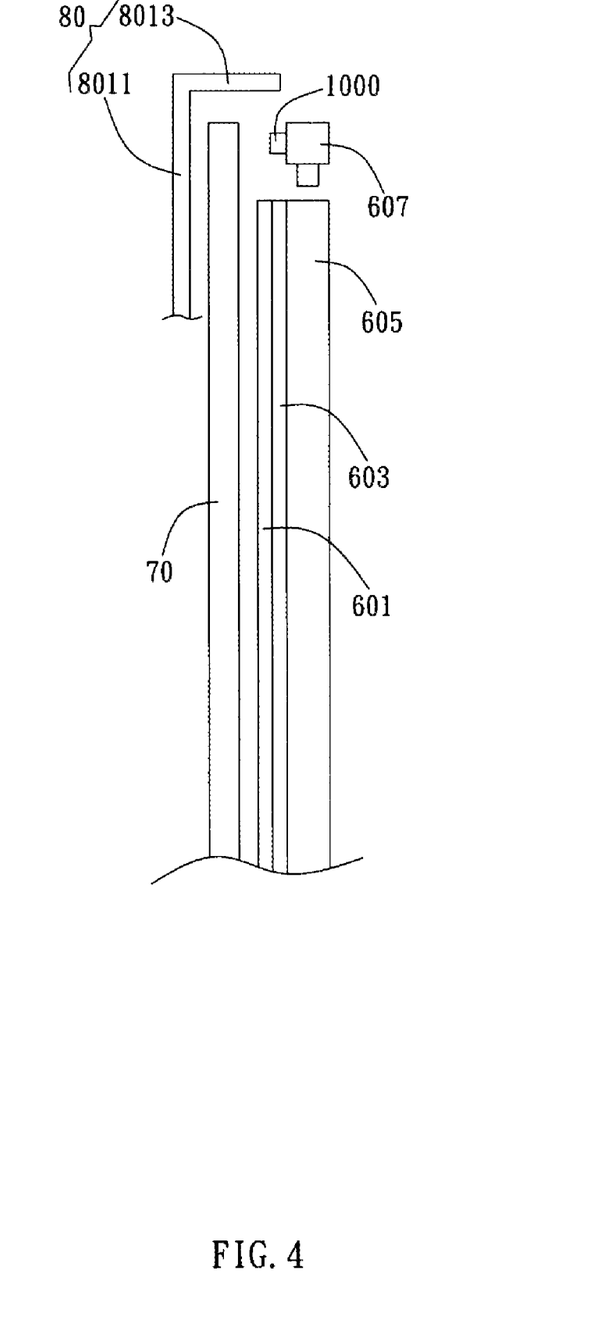
FIG. 4 illustrates a side view of an embodiment of the display device of FIG.3.

FIG. 4 is a side view of the display module 50 according to the above-mentioned embodiment. Please refer to FIGS. 3 and 4, the front frame 801 of the frame 80 has a front frame surface 8011 and a top frame surface 8013. The top frame surface 8013 extends from an edge of the front frame surface 8011 and is perpendicular to the front frame surface 8011, such that the top frame surface 801 3 and the front frame surface 8011 are connected to form an L-shape cover portion. As FIG. 4 shows, the position of the light source module 607 is disposed corresponding to the L-shape cover portion. Moreover, since the signal receiver 1000 of the present embodiment is disposed on the light source module 607, thus the signal receiver 1000 is also disposed corresponding to the cover portion. Since components of the display panel 70 have light transmission property, if the signal receiver 1000 is disposed within the range of the display area, the user may see a shadow/spot caused by the signal receiver 1000 when viewing the display area. Therefore, such an arrangement enables the signal receiver 1000 of the above-mentioned arrangement to be hidden in the backlight module 60 behind the frame 80. That is, the signal receiver 1000 is disposed in the non-display area not to affect the display images in the display area. The signal receiver of the above-mentioned embodiment is described using the directional signal receiver as an example; however, in other embodiments, the signal receiver is not limited to the directional signal receiver and can be any kinds of wireless remote control signal receiver, such as an RF remote control signal receiver.

Figure 5:
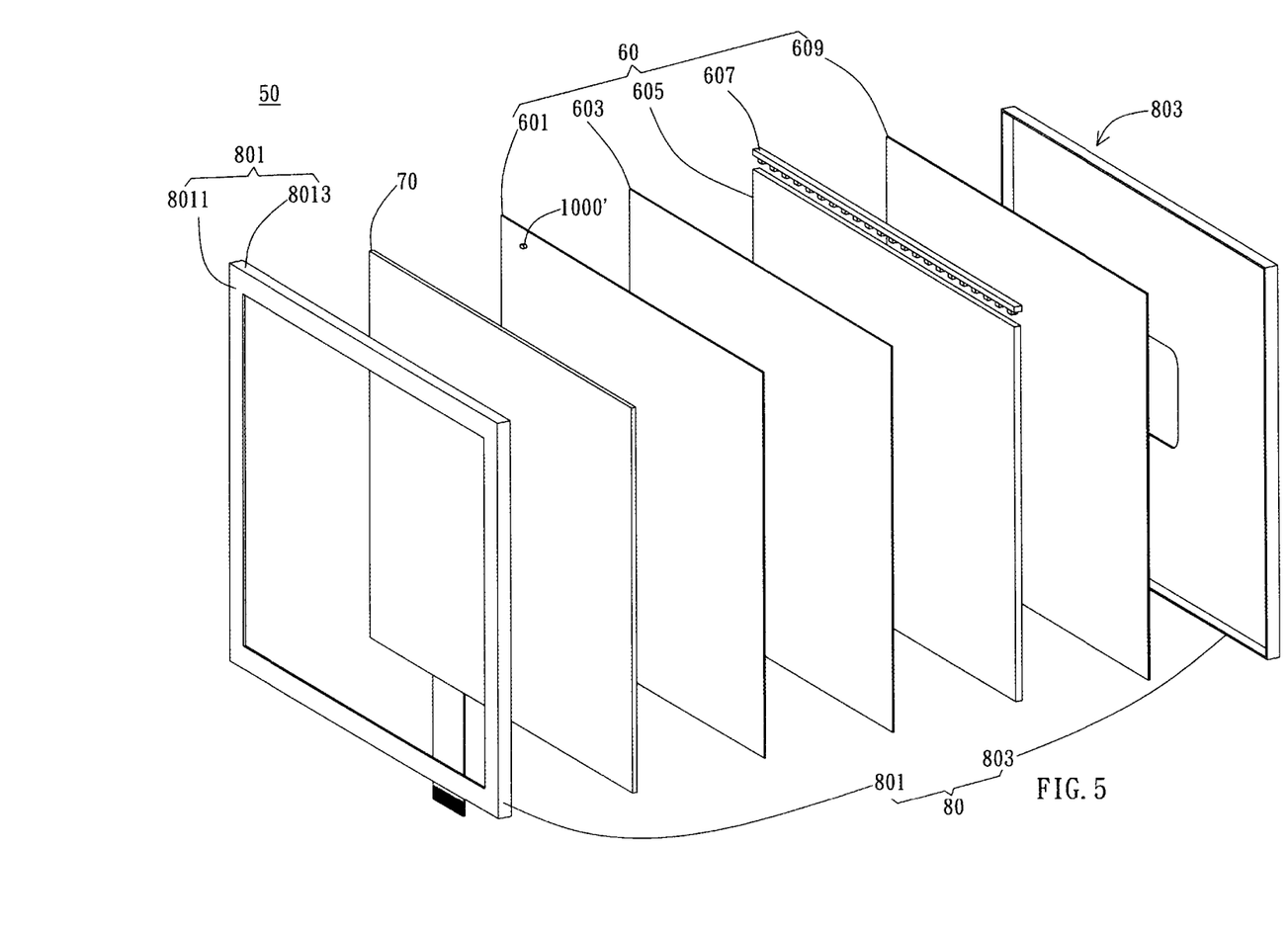
FIG. 5 illustrates an exploded view of another embodiment of the display module according to the present invention.

FIG. 5 is an exploded view of a display module according to another embodiment of the present invention. The frame 80, the backlight module 60, and the display panel 70 included in the display module 50 of the present embodiment are similar to those described in the above embodiments, and thus detailed descriptions thereof are not elaborated. Compared to the embodiment of FIG. 4, the signal receiver of the present embodiment has a different arrangement and can be a different kind receiver. Unlike the embodiment of FIG. 4, the signal receiver 1000' of the present embodiment is not disposed on the light source module 607. As shown in FIG. 5, the signal receiver 1000' is disposed on an edge of the backlight module 60. Specifically, the signal receiver 1000' is selectively disposed on any of four edges of any component of the backlight module 60, wherein all of the edges are disposed corresponding to the cover portion formed by the front frame surface 8011 and the top frame surface 8013 of the frame 80. Furthermore, the signal receiver 1000' may be disposed directly on the cover portion (not shown) formed by the front frame surface 8011 and the top frame surface 8013 of the frame 80.

Figure 6:
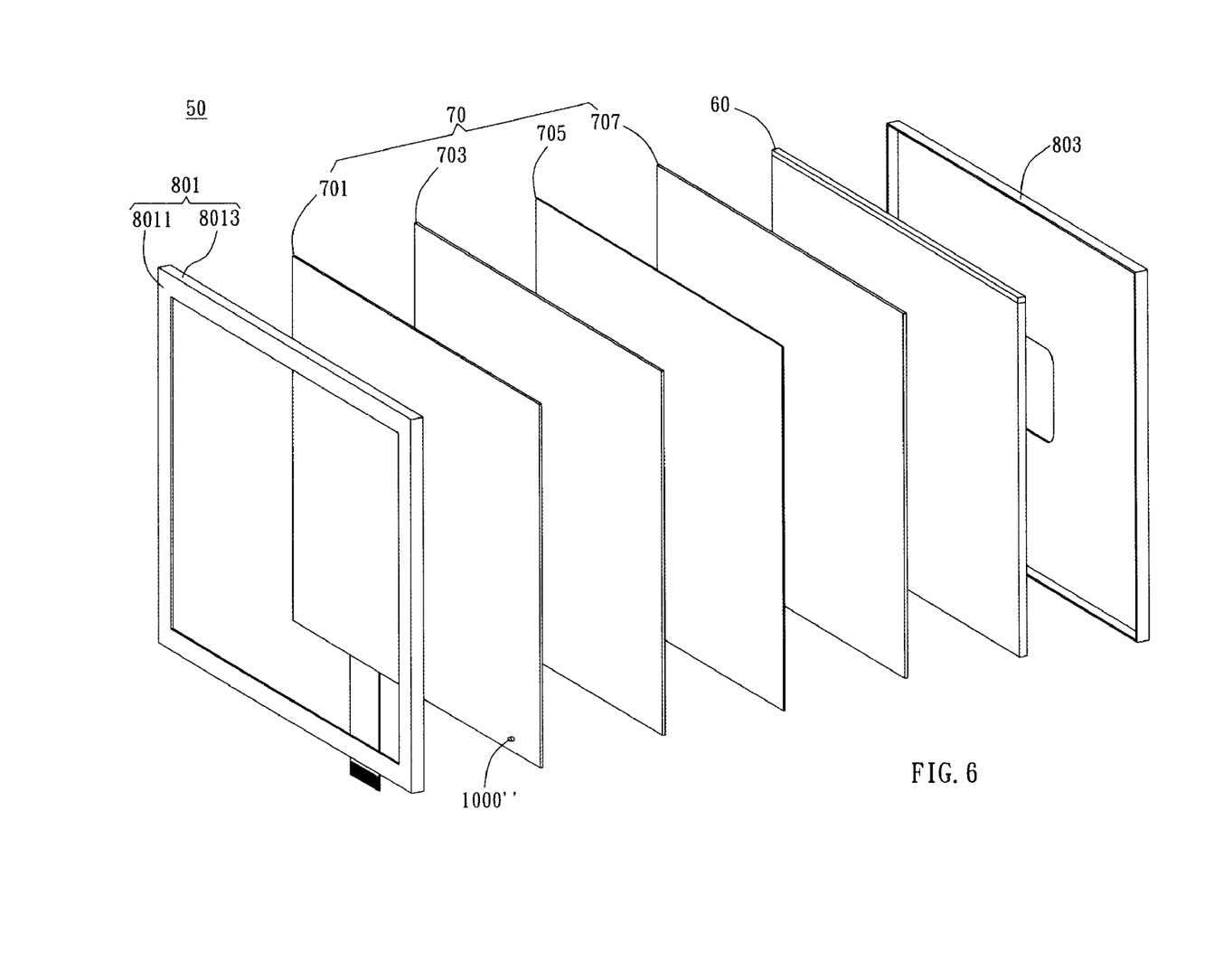
FIG. 6 illustrates an exploded view of a further embodiment of the display device according to the present invention.

FIG. 6 further shows an exploded view of the display panel 70 of the display device according to another embodiment of the present invention. As shown in FIG. 6, the display panel 70 of the present embodiment is a liquid crystal display panel for use with the backlight module 60. More specifically, as shown in FIG. 6, the display panel 70 includes a polarizing plate 701, an upper substrate 703, optical films 705, and a lower substrate 707. The polarizing plate 701 is disposed on the upper substrate 703, and the optical films 705 are disposed between the upper substrate 703 and the lower substrate 707. The lower substrate 707 includes an active array device structure (e.g. a thin film transistor array structure) disposed thereon. Liquid crystals are filled between the optical films 705 and the lower substrate 707. The polarizing plate 701 is configured to ensure the light traveling direction. The upper substrate 703 and the lower substrate 707 are made of glass material having light transmission property. The optical films 705 include, for example, a light filter and a protection film and are made of optical resin.

In other embodiments, the display panel 70 may be a different kind display panel, such as an organic light emitting diode (OLED) panel. Particularly, a signal receiver 1000" is disposed on an edge of the display panel 70. In fact, the signal receiver 1000" is selectively disposed on any of four edges of the display panel 70, wherein the edges are disposed corresponding to the cover portion formed by the front frame surface 8011 and the top frame surface 8013 of the frame 80. Furthermore, the signal receiver 1000" may be directly disposed on the cover portion (not shown) formed by the front frame surface 8011 and the top frame surface 8013 of frame 80. In brief, in the embodiments, the signal receiver is disposed corresponding to the cover portion formed by the frame 80 of the display module 50, i.e., the signal receiver is disposed in the non-display area to avoid the signal receiver causing shadow in the display area. Moreover, if the signal receiver of FIGS. 5 and 6 are not disposed on an edge of a light guide component (such as the light guide plate) or a light source module, the signal receiver is preferably a non-directional wireless signal receiver for receiving a non-directional wireless signal, such as a blue tooth signal, an RF signal, or other high frequency wave signal.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:
1. A display device, comprising:
a housing having a front opening;
a display module disposed in the housing, a display area formed on the display module corresponding to the front opening, the display module including a backlight module, the backlight module including a light source mod- ule and a light guide plate, the light source module being disposed on one side of the light guide plate; and a signal receiver, disposed on the light source module and connecting to the light source module inside the display module corresponding to a non-display area, for receiving a signal from outside, the signal receiver including a light signal receiver disposed on the light source module facing the light guide plate, wherein a light signal is transmitted via the light guide plate to the light signal receiver.

2. The display device of claim 1, wherein the backlight module further includes a plurality of optical films.

3. The display device of claim 1, wherein the display module includes a frame comprising: a front frame surface; and a top frame surface disposed extending along the edge of the front frame surface and perpendicularly connected to the front frame surface to form a cover portion in L-shape, wherein the light source module is disposed corresponding to the cover portion.

4. The display device of claim 1, wherein the light signal receiver is a directional signal receiver.

5. The display device of claim 1, wherein the display module includes a frame comprising: a front frame surface; and a top frame surface disposed extending along the edge of the front frame surface and perpendicularly connected to the front frame surface to form a cover portion in L-shape, wherein each edge of the backlight module is disposed corresponding to the cover portion, and the signal receiver is disposed on the backlight module corresponding to the cover portion.

6. The display module of claim 5, wherein the backlight module includes a light source module and a plurality of optical firms, the light source module aligns parallel to the optical firms.

7. The display module of claim 5, wherein the signal receiver is a wireless signal receiver for receiving a wireless signal from outside.

8. The display device of claim 1, wherein the housing includes a front housing, the front opening formed on the front housing, the display module further includes a display panel, wherein the display panel is disposed between the backlight module and the front housing, and the display panel forms the display area to display images from the front opening.

9. The display device of claim 8, wherein the display module includes a frame comprising: a front frame surface; and a top frame surface disposed extending along the edge of the front frame surface and perpendicularly connected to the front frame surface to form a cover portion in L-shape, wherein each edge of the display panel is disposed corresponding to the cover portion, and the signal receiver is disposed on the display panel corresponding to the cover portion.

10. The display device of claim 8, wherein the display panel includes a polarizing plate, an upper substrate, a set of optical films, and a lower substrate.

11. The display device of claim 10, wherein the display panel includes a liquid crystal filled between the lower substrate and the set of optical films.

* * * * *